United States Patent [19]

Anderson

[11] Patent Number: 5,055,153

[45] Date of Patent: Oct. 8, 1991

[54] PROCESS FOR PROVIDING A MULTIPLE PART FORM FOR NON-IMPACT PRINTER

[75] Inventor: Michael W. Anderson, Erie, N.Y.

[73] Assignee: Moore Business Forms, Inc., Grand Island, N.Y.

[21] Appl. No.: 491,057

[22] Filed: Mar. 9, 1990

Related U.S. Application Data

[62] Division of Ser. No. 331,302, Mar. 31, 1989, Pat. No. 4,925,243.

[51] Int. Cl.[5] .............................................. B32B 31/18

[52] U.S. Cl. .................................... 156/252; 156/253; 156/260; 156/264; 282/6; 282/10; 282/25

[58] Field of Search ............... 156/252, 253, 260, 264; 282/12 A, 11.5 R, 12 R, 11.5 A; 428/43, 194

[56] References Cited

U.S. PATENT DOCUMENTS

| | | | |
|---|---|---|---|
| 2,907,585 | 10/1959 | Sornberger et al. | 282/12 R |
| 3,916,051 | 10/1975 | Wakeman | 282/11.5 A |
| 4,070,223 | 1/1978 | Stalzer | 156/264 |
| 4,375,868 | 3/1983 | Slotar et al. | 282/11.5 A |
| 4,627,994 | 12/1986 | Welsch | 282/12 A |
| 4,696,843 | 9/1987 | Schmidt | 282/12 A |

*Primary Examiner*—Caleb Weston
*Attorney, Agent, or Firm*—Nixon & Vanderhye

[57] ABSTRACT

A business forms assembly and method of forming is provided wherein a continuous web defines a plurality of successive form sets and wherein the web is divided longitudinally by a slit indicator line to define adjacent form parts for each set. Carbonless transfer technology is employed, such that a back side or undersurface of one form part (the upper part) is coated with carbonless microcapsules, while a front side or upper surface of the adjacent form part (the lower part) is coated with a co-reactant resin coating. The arrangement permits variable information to be printed on the adjacent form parts as the web passes through a non-impact printer. Thereafter, the web is longitudinally slit, separating the adjacent form parts which are thereafter interstacked so that the coating on the undersurface of the upper form part lies in full surface engagement with the coating on the upper surface of the lower form part. The respective form parts may then be adhesively secured. Thereafter, information imaged onto the upper form part is simultaneously imaged onto the lower form part.

15 Claims, 3 Drawing Sheets

FIG. 3
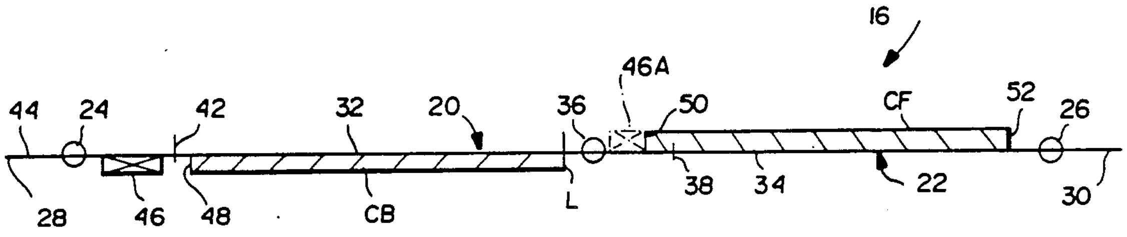
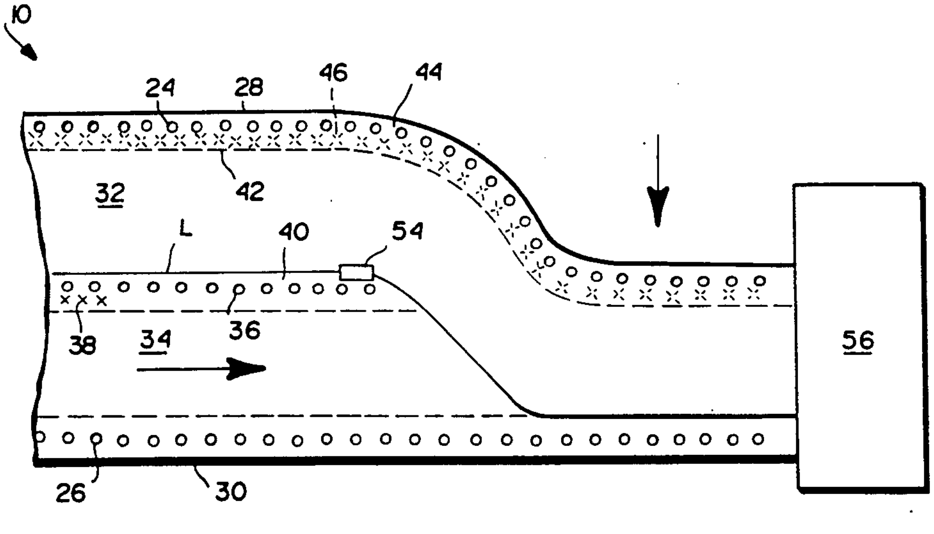
FIG. 4

PROCESS FOR PROVIDING A MULTIPLE PART FORM FOR NON-IMPACT PRINTER

This is a division of application Ser. No. 07/331,302 filed Mar. 31, 1989, U.S. Pat. No. 4,925,243.

BACKGROUND AND SUMMARY OF THE INVENTION

The present invention relates to a multi-part business form, and more specifically, to a multi-part form which may be processed through a non-impact printer in single sheet, continuous web form, and through subsequent forms handling and/or processing stations in two-ply continuous web (or individual sheet) form.

Presently, there is a need for a business form assembly which is capable of being processed through a non-impact printer so that information can be printed on various, selected parts of the form, but which utilizes image transfer techniques for the addition of still further information to the form by an impact printer, or by manual means, such as a typewriter, etc.

The present invention satisfies this need by a relatively simple forms construction which can be processed through a non-impact printer, without activating the image transfer means, and thereafter rearranged so that cooperating image transfer means are in position to transfer information applied to one sheet onto an underlying sheet.

In one exemplary embodiment of the invention, a continuous web is divided into successive form sets in a conventional manner by longitudinally spaced, transverse lines of perforations. A first longitudinally extending line of perforations, is provided substantially centrally of the web (or to one or the other side of center, depending on form configuration) to define a stub portion when the web is subsequently slit longitudinally along a parallel indicator line, to thereby separate the web into first and second, adjacent form parts. In accordance with the invention, the lower surface of the first form part is provided with a coating of carbonless microcapsules containing a liquid fill comprising a chemically reactive color-forming precursor, referred to herein as a CB (coated back) coating.

At the same time, the upper surface of the adjacent or second form part is provided with a dry co-reactant resin coating referred to herein as a CF (coated front) coating. The CB and CF coatings described hereinabove comprise carbonless image transfer means of the type disclosed in U.S. Pat. No. 4,199,174, which is owned by the assignee of the present invention, and which is hereby incorporated by reference.

Longitudinally extending feed holes are provided along each marginal edge of the continuous web so that the web may be engaged by a conventional tractor drive mechanism for feeding the web through one or more processing stations. It will be understood, however, that any suitable drive means may be employed to move the continuous web through the one or more processing stations. A third intermediate and longitudinally extending line of feed holes is provided adjacent the first longitudinal perforation line for a purpose to be described further herein.

In addition, a longitudinally extending glue line, preferably a heat seal type adhesive, is provided along, and inside, one marginal line of feed holes, but outside a second longitudinally extending perforation line, which defines a marginal stub portion.

The above described arrangement permits variable information to be applied to one or both form parts in a non-impact printer as the form passes therethrough in a two-wide (side-by-side), single ply configuration.

Subsequently, and as briefly mentioned above, the web may be engaged by a conventional slitting mechanism which separates the form parts along the slit indicator line, a line adjacent the third, intermediate of feed holes, but on the opposite side thereof, vis-a-vis the first longitudinal perforation line. It will be understood that the precise location of the first perforation line, the slit indicator line, and the third intermediate line of feed holes may be varied depending on the particular form configuration.

The separated parts are then interstacked by a conventional interstacking device, such that the first, and now upper, form part overlies the second, and now lower, form part so that the marginal feed holes of the lower form part are vertically aligned with the intermediate (and now marginal) feed holes of the upper form part. In this configuration, the CB coating on the back of the upper form part is in full surface engagement with the CF coating on the front of the lower form part so that, subsequently, information applied to the upper form part will be imaged onto the lower form part, through the interaction of the CB and CF coatings.

After the form parts are interstacked and aligned the heat seal adhesive is activated to secure the respective form parts together.

Accordingly, in one exemplary embodiment of the present invention, a process for making a multi-part, carbonless imaging type form comprises the steps of:

(a) providing a web having marginal edges and divided longitudinally into first and second form parts, (b) applying a first image transfer means to one side of the first form part;

(c) applying a second cooperating image transfer means to an opposite side of the second form part;

(d) printing variable information on one or both of the first and second form parts;

(e) longitudinally slitting the web to separate the first and second form parts; and (f) interstacking the first and second form parts so that the first and second form parts overlie each other, with the first and second image transfer means being in surface engagement.

It will be appreciated that the above steps, and particularly steps (a) through (e), need not be carried out in the indicated order.

In another aspect of the present invention, a business forms assembly blank is provided which comprises:

a web having upper and lower surfaces and including first and second side-by-side form parts;

the lower surface of the web having first image transfer means applied thereto in an area corresponding to the first form part, and the upper surface of web having second cooperating image transfer means applied thereto in an area corresponding to the second form part.

It will be appreciated that the product and process disclosed herein affords great flexibility, simplicity and reduced cost in the manufacture of forms blanks which are to be at least partially printed before being supplied to the customer.

Additional objects and advantages of the invention will become apparent from the detailed description of the invention which follows.

BRIEF DESCRIPTION OF THE DRAWINGS

FIG. 3 is a schematic cross-section of the web illustrated in FIG. 1; and

FIG. 4 is a schematic diagram of a slitting and interstacking mechanism in a process in accordance with the invention.

DETAILED DESCRIPTION OF THE DRAWINGS

Figure 1:
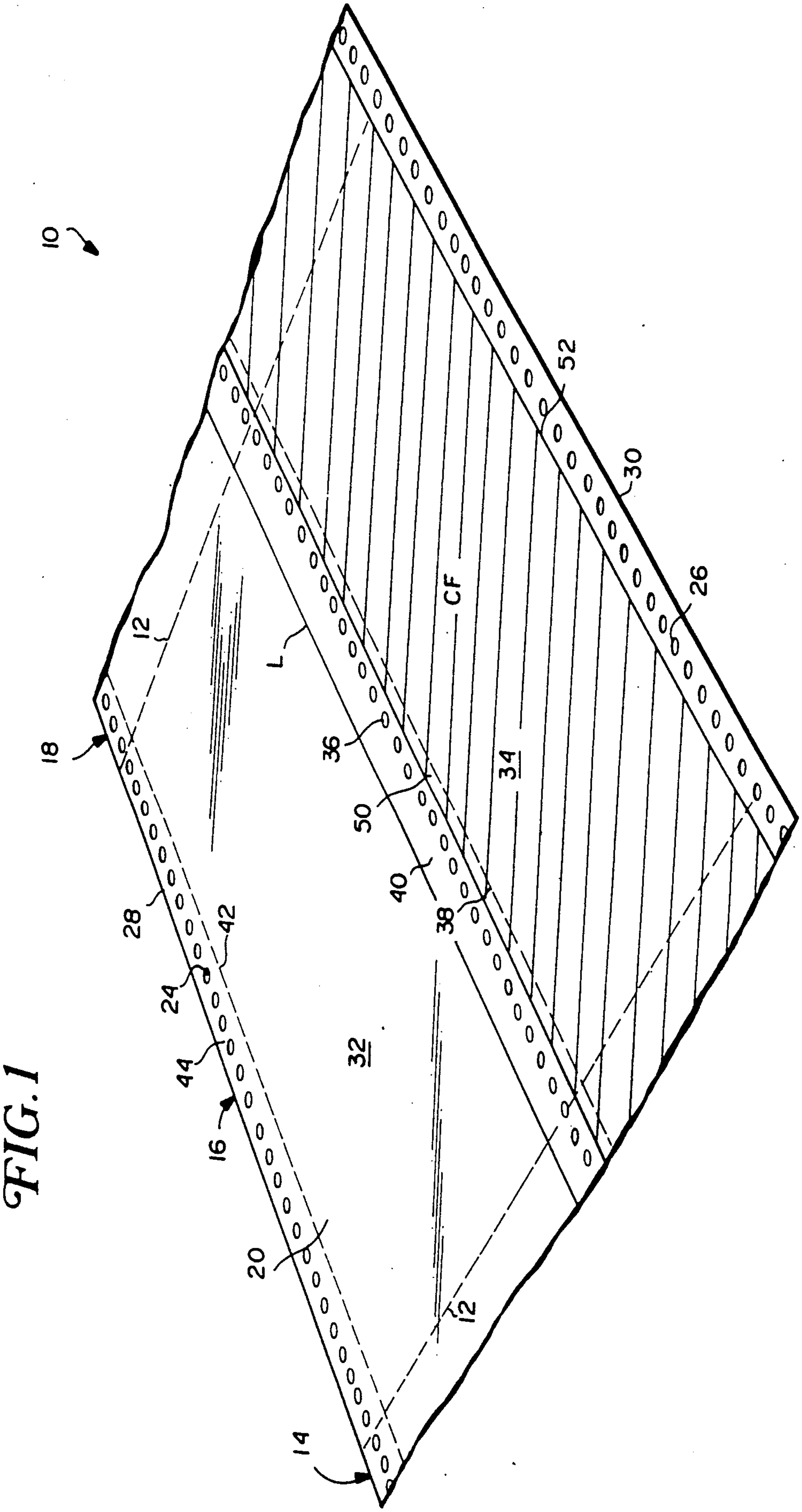
FIG. 1 is a partial perspective view of the upper surface of a continuous web business forms assembly in accordance with this invention.
Figure 2:
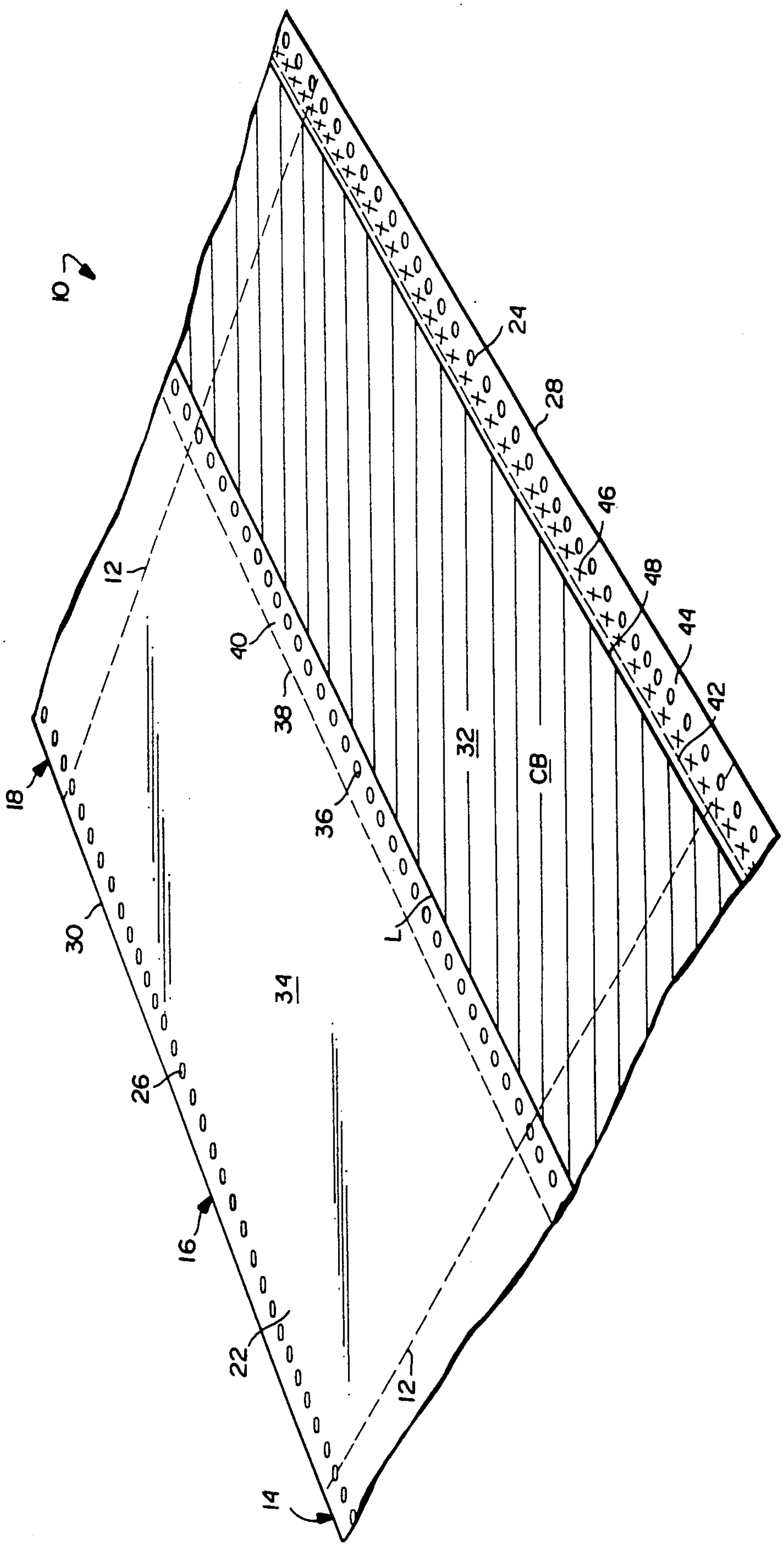
FIG. 2 is a partial perspective view of the lower surface of the assembly illustrated in FIG. 1.

Referring now to FIGS. 1–3, an exemplary embodiment of the invention is illustrated wherein a continuous paper web 10 is provided with longitudinally spaced transverse lines of perforations 12 which define successive form sets 14, 16 and 18. Since the form sets are identical, only one need be described further.

The form set 16, for example, has an upper surface 20 and a lower surface 22. Longitudinally spaced feed holes 24, 26 are provided along each marginal edge 28, 30, respectively, for engagement with suitable tractor drive wheels (or belts or the like) in a conventional manner.

The web is divided into first and second side-by-side form parts 32, 34 by an indicator line L extending longitudinally of the web, intermediate the longitudinal edges 28, 30. It will be appreciated that the precise location of the indicator line may be varied, depending on form configuration. It will further be appreciated that while the indicator line L facilitates lateral adjustment of the slitting mechanism to the desired location, other suitable means may be employed for this purpose, so that line L, for purposes of describing this invention, may be real or imaginary.

A third, intermediate line of feed holes 36 extends along the web, intermediate the marginal feed holes 24, 26, and generally adjacent the indicator line L, for a purpose explained below. Adjacent the intermediate line of feed holes 36, but on the side opposite the indicator line L, there is provided a first longitudinally extending perforation line 38, thereby defining a stub portion 40 upon separation of the form parts along line L.

A second longitudinally extending perforation line 42 is provided on form part 32 laterally inwardly of the line of feed holes 24, to form a marginal stub portion 44 along edge 28. It will be understood that a third longitudinally extending perforation line, shown in phantom in FIG. 4, may be provided adjacent feed holes 26 to create a similar marginal stub portion along edge 30 if desired.

As explained in greater detail below, upon separation and interstacking of form parts 32 and 34, the stub portions 40, 44 and respective lines of feed holes 36, 24 will be vertically aligned.

With reference to FIGS. 2 and 3, on the lower surface 22 of form part 32, located between the feed holes 24 and perforation line 42 is a line 46 of heat seal (or other) adhesive for a purpose described further below. Depending on the particular form configuration, the adhesive may be located elsewhere, for example, on upper surface 20 of form part 34 as shown in phantom at 46A in FIG. 3.

The lower surface 22 of form part 32 is further provided with a CB coating extending substantially over the entire surface of the form part, from an edge 48 just inside the second perforation line 42 across the width of the form part to the slit line L adjacent the centrally located line of feed holes 36.

The upper surface 20 of form part 34 is provided with a CF coating over substantially its entire surface, extending across the width of the form from an edge 50 between feed holes 36 and the first perforation line 38, to an edge 52 adjacent and just inside the feed holes 26, as best seen in FIG. 1.

With reference now to FIG. 4, a web processing line is schematically illustrated wherein the web 10 is fed longitudinally past a slitting mechanism 54 and slit along the indicator line L to to longitudinally separate the web into the respective form parts 32, 34. The slitting mechanism is a conventional device which need not be described in detail. Just beyond the slitting mechanism, the respective form parts are interstacked, i.e., form part 32 is moved laterally over the form part 34 by a conventional interstacker so that the parts are in overlying relationship, with stub portions 44, 40 and respective feed holes 24, 36 in vertical alignment. The form parts are then fed to additional processing stations, such as the sealer 56 where the marginal stub portion 44 on the form part 32 is sealed via adhesive line 46 to the stub portion 40 of the lower form part 34. The web is then forwarded to other processing stations if required.

It will be appreciated, of course, that other forms configurations are within the scope of this invention. For example, the location of one or more adhesive lines, the type of adhesive, the location and number of longitudinal perforation lines, and the number of form parts to be interstacked may be varied as necessary for particular forms applications. Moreover, whether or not the lines of feed holes are utilized depends on the type of web drive.

In a related aspect of the invention, a process of making a multi-part business form adapted for pre-printing in a non-impact printer comprises, in its broader aspects, the steps of:

(a) providing a web 10 having longitudinal marginal edges 28, 30, and divided longitudinally into first and second form parts 32, 34;

(b) applying a first image transfer means (CB) to one side 22 of the first form part 32;

(c) applying a second cooperating image transfer means (CF) to an opposite side 20 of the second form part 34;

(d) printing variable information on one or both of the first and second form parts 32, 34;

(e) longitudinally slitting the web to separate the first and second form parts 32, 34 along a longitudinal slit line L; and (f) interstacking the first and second form parts 32, 34 so that the first and second form parts overlie each other, with the first and second image transfer means CB, CF being in full surface engagement.

It will be appreciated that the above sequence of steps, particularly steps (b) through (e), need not be carried out in the indicated sequential order. In addition, it will be understood that additional steps may be carried out to provide the desired form configuration such as placement of perforation lines, slit indicator line, intermediate feed holes, adhesive lines and the like.

The web is then ready for conventional accordion or zigzag folding (or immediate separation along the transverse perforation lines) and subsequent shipment to the customer for final printing of variable information and/or other process steps.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for providing a multi-part business form wherein a first upper part overlies a second lower part, said first upper and said second lower parts constructed so that information applied to a face of said first upper part will transfer onto a face of said second lower part, and wherein at least one of said first upper and said second lower parts is preprinted with variable information which is not transferred onto the other of said first upper and second lower parts, the process comprising:

(a) providing a web having longitudinal marginal edges, and divided longitudinally into first and second form parts;

(b) applying a first image transfer means to one side of said first form part;

(c) applying a second cooperating image transfer means to an opposite side of said second form part;

(d) printing variable information on one or both of said first and second form parts;

(e) longitudinally slitting the web to separate the first and second form parts; and (f) interstacking said first and second form parts to form said first upper and said second lower form parts, with said first and second image transfer means being in full surface engagement.

2. A process according to claim 1 wherein as a result of step (f) at least one marginal edge of said first form is in vertical alignment with at least one marginal edge of said second form part.

3. A process according to claim 2 wherein, following step (f), said first and second form parts are adhesively secured together.

4. A process according to claim 1 wherein said first image transfer means comprises a coating of carbonless microcapsules.

5. A process according to claim 4 wherein said second cooperating image means comprises a co-reactant resin coating.

6. A process according to claim 1 and wherein said web is in continuous form, and wherein transverse lines of perforations extend between the marginal edges at longitudinally spaced locations to define individual, successive form sets.

7. A process according to claim 1 wherein said at least one of the first and second form parts are preprinted in a non-impact printer during step (d).

8. A process according to claim 1 wherein said first image transfer means comprises a coating of carbonless microcapsules, and wherein said second cooperating image means comprises a co-reactant resin coating, and further wherein one or both of the first and second form parts are preprinted in a non-impact printer during step (d).

9. A process according to claim 1 and including the step of providing first and second lines of longitudinally spaced feed holes along said marginal edges, and including the further step of applying an adhesive along one of said first and second lines of feed holes.

10. A process according to claim 9 wherein said adhesive is a heat seal adhesive applied to said one side of said first form part laterally inwardly of said first line of feed holes.

11. A process according to claim 1 including the step of providing a longitudinally extending slit indicator line on said web to define said first and second form parts and to facilitate carrying out step (e).

12. A process according to claim 1 wherein during steps (b) and (c), said first and second image transfer means are applied over substantially the entire surface of each of said respective one and opposite sides of said first and second form parts with the exception of areas along said marginal edges.

13. A process according to claim 1 and including the steps of providing first and second lines of longitudinally spaced feed holes along the marginal edges of said web, and a third line of longitudinally spaced feed holes intermediate and parallel to the first and second lines of feed holes.

14. A process according to claim 13 and including the steps of forming a first longitudinally extending perforation line adjacent one side of said third line of feed holes, and a second longitudinally extending perforation line adjacent one of said first and second lines of feed holes.

15. A process according to claim 14 and including the step of slitting the web along a line adjacent the other side of said third line of feed holes, so that after step (f), said first and second longitudinally extending perforation lines are in vertical alignment.

* * * * *